(12) United States Patent
Alic

(10) Patent No.: US 12,178,300 B2
(45) Date of Patent: Dec. 31, 2024

(54) TEMPERATURE CONTROLLING ELECTRONIC DEVICE HOLDER

(71) Applicant: BLUEBRICK COMPANY, LLC, Findlay, OH (US)

(72) Inventor: Melinda Alic, Findlay, OH (US)

(73) Assignee: BLUEBRICK COMPANY, LLC, Findlay, OH (US)

(*) Notice: Subject to any disclaimer, the term of this patent is extended or adjusted under 35 U.S.C. 154(b) by 476 days.

(21) Appl. No.: 17/460,445

(22) Filed: Aug. 30, 2021

(65) Prior Publication Data

US 2022/0061486 A1 Mar. 3, 2022

Related U.S. Application Data

(60) Provisional application No. 63/181,588, filed on Apr. 29, 2021, provisional application No. 63/071,826, filed on Aug. 28, 2020.

(51) Int. Cl.
*A45C 15/00* (2006.01)
*A45C 11/00* (2006.01)
*F25D 3/06* (2006.01)

(52) U.S. Cl.
CPC .............. *A45C 15/00* (2013.01); *A45C 11/00* (2013.01); *A45C 2011/002* (2013.01); *A45C 2011/003* (2013.01); *F25D 3/06* (2013.01)

(58) Field of Classification Search
CPC ... A45C 15/00; A45C 11/00; A45C 2011/002; A45C 2011/003; G06F 1/203
See application file for complete search history.

(56) References Cited

U.S. PATENT DOCUMENTS

| | | | | |
|---|---|---|---|---|
| 2016/0088762 A1* | 3/2016 | Wu | ........................ | G06F 1/203 |
| | | | | 165/80.2 |
| 2017/0054833 A1* | 2/2017 | Wong | .................. | H04M 1/0202 |
| 2018/0081397 A1* | 3/2018 | Yoshifumi | .............. | G06F 1/203 |
| 2018/0092241 A1* | 3/2018 | Rasmussen | .......... | H05K 5/0086 |
| 2018/0321717 A1* | 11/2018 | Yang | ........................ | G06F 1/203 |
| 2019/0004574 A1* | 1/2019 | Wang | .................... | G06F 1/1626 |
| 2019/0121407 A1* | 4/2019 | Lee | ........................ | G06F 1/183 |
| 2019/0346893 A1* | 11/2019 | Dillow | .................. | G06F 1/1626 |
| 2020/0201402 A1* | 6/2020 | Lee | ........................ | H02J 50/402 |
| 2020/0241610 A1* | 7/2020 | Kwon | .................. | G06F 1/1626 |

\* cited by examiner

*Primary Examiner* — Steve S Tanenbaum
(74) *Attorney, Agent, or Firm* — Jacob M. Ward; Ward Law Office LLC

(57) ABSTRACT

An electronic device holder for controlling a temperature of an electronic device includes a shell body having a bottom wall, a top portion, and a dividing wall between the bottom wall and top portion. A shell cap is detachably coupled to the shell body and configured to move between an open position and a closed position. A removable temperature controlling insert is disposed in the shell body, and a card aperture is disposed on the top portion of the shell body. The card aperture is configured to receive a card to be processed by a card reader. When the shell cap is in the closed position, the shell cap is coupled to the shell body and forms a cavity at the top portion of the shell body and forms a chamber adjacent the cavity. The chamber is configured to enclose the removable temperature controlling insert.

20 Claims, 11 Drawing Sheets

TEMPERATURE CONTROLLING ELECTRONIC DEVICE HOLDER

CROSS-REFERENCE TO RELATED APPLICATIONS

This application claims priority to and the benefit of U.S. Provisional Application No. 63/071,826, filed on Aug. 28, 2020, and U.S. Provisional Application No. 63/181,588, filed on Apr. 29, 2021. The entire disclosures of the above applications are hereby incorporated herein by reference.

FIELD

The present disclosure relates to electronic device cases and, more particularly, to cases for portable electronic devices.

BACKGROUND

The statements in this section merely provide background information related to the present disclosure and may not constitute prior art.

A significant problem facing the computer industry is heat. The higher the temperature a component operates at, the more likely it is to fail. Also, high temperatures, while not causing catastrophic failures, can create data processing errors. Operation at high temperatures can cause power fluctuations that lead to these errors within a central processing unit (CPU) or on the motherboard anywhere that data management is handled. Despite efforts at reducing waste heat while increasing processing power, each new CPU and graphics processing unit (GPU) released on the market runs hotter than the last. Power Supply and motherboard components required to provide power and handle signal processing also are producing more and more heat with every new generation. These problems may also be exacerbated by harsh temperatures and conditions in an environment surrounding the computer.

One known method of cooling computer components employs a closed-cell extruded polystyrene foam case that retains a computer. The closed-cell extruded polystyrene foam case also retains ice for cooling the computer. However, this known method fails to safely retain the computer due to the ice producing condensation around the computer. As more condensation forms, there is a higher likelihood of water damage that may occur to the computer.

In another known cooling system, a case that retains a computer also includes at least one fan. The at least one fan is designed to create airflow around the computer. However, this known method fails to adequately cool the computer to an optimal operating temperature, especially where the external environment includes hot air. Undesirably, to operate the at least one fan, the case must provide a power source which typically includes separate batteries or utilizing the limited power supply of the computer.

These known methods of cooling computer components can be expensive to implement and are not sufficient to safely and adequately cool the computer components where the surrounding environment of the computer has harsh temperatures. Despite prior attempts to cool computer components, further improvements to cooling systems are necessary.

There is a continuing need for a temperature controlling electronic device holder that has the capability to safely and adequately control the temperature of the computer components where an external environment has harsh temperatures and conditions. Desirably, the temperature controlling electronic device holder will also be designed to protect the computer from damage.

SUMMARY

In concordance with the instant disclosure, a temperature controlling electronic device holder that has the capability to safely and adequately control the temperature of computer components of the electronic device where an external environment has harsh temperatures and conditions, and where the electronic device holder is also designed to protect the computer from damage, has surprisingly been discovered.

The present disclosure includes an electronic device holder for controlling a temperature of an electronic device, the electronic device holder having a shell body including a bottom wall, a top portion, and a dividing wall between the bottom wall and top portion, a shell cap detachably coupled to the shell body, the shell cap configured to move between an open position and a closed position, a removable temperature controlling insert disposed in the shell body, and a card aperture disposed on the top portion of the shell body, the card aperture configured to receive a card to be processed by a card reader. When the shell cap is in the closed position, the shell cap is coupled to the shell body and forms a cavity at the top portion of the shell body and a chamber adjacent the cavity, the chamber configured to enclose the removable temperature controlling insert.

In one example, the shell body includes an upper protrusion extending from the dividing wall and a lower protrusion extending from the bottom wall, and the shell cap includes an upper slot configured to receive the upper protrusion for sliding engagement and a lower slot configured to receive the lower protrusion for sliding engagement.

In another example, the upper protrusion and lower protrusion are configured to slide within the upper slot and lower slot in a forward direction and rearward direction to move the shell cap between the open position and closed position.

In various other examples, the electronic device may further include a lock assembly disposed on the shell body, the lock assembly configure to lock the shell cap in place when the shell cap is in the closed position. The electronic device holder may further include an access port, a pillar formed by a curved hollow located at a corner of the electronic device holder and/or a camera passage including a first aperture formed in the dividing wall of the shell body, a second aperture formed in the bottom wall of the shell body, and a slanted sidewall connecting the first aperture and the second aperture. The perimeter of the second aperture may be greater than the perimeter of the first aperture.

In another embodiment, an electronic device holder for controlling a temperature of an electronic device includes a shell body including a bottom wall, a top portion, and a dividing wall between the bottom wall and top portion, a shell cap detachably coupled to the shell body, the shell cap configured to move between an open position and a closed position, a removable temperature controlling insert disposed in the shell body, and a coupling mechanism configured to removably couple a payment processing unit to the bottom wall of the shell body. When the shell cap is in the closed position, the shell body and the shell cap come together to form a cavity configured to partially enclose the electronic device and a chamber adjacent the cavity, the chamber configured to enclose the removable temperature controlling insert.

In one example, the electronic device includes an attachment aperture disposed on the bottom wall of the shell body, wherein the coupling mechanism includes a mounting plate having mating features, and the attachment aperture is configured to receive the mating features.

In another example, the electronic device holder includes an attachment aperture disposed on the bottom wall of the shell body, wherein the coupling mechanism includes a mounting plate having a circumferential rib and a plurality of snap hooks disposed concentrically interiorly of the circumferential rib, the plurality of snap hooks configured to mate with the attachment aperture. In this example, a circumferential channel may be formed between the circumferential rib and the plurality of snap hooks, wherein the circumferential channel is configured to receive a radial projection extending from the attachment aperture.

In various other examples, the electronic device holder includes a camera passage including a first aperture formed in the dividing wall of the shell body, a second aperture formed in the bottom wall of the shell body, and a slanted sidewall connecting the first aperture and the second aperture. The electronic device holder may include a plurality of support ribs disposed along a sidewall of the shell body and a sidewall of the shell cap, wherein the plurality of support ribs are disposed at a predetermined distance between each support rib.

In another embodiment, an electronic device holder for controlling a temperature of an electronic device includes a shell body including a bottom wall and a top portion, a shell cap detachably coupled to the shell body, the shell cap configured to move between an open position and a closed position, a circular locking mechanism disposed at the bottom wall of the shell body, the circular locking mechanism including a cylindrical body, an inner disc, and an outer disc, the inner disc and the outer disc are disposed at opposing ends of the cylindrical body, a removable temperature controlling insert disposed in the shell body, and a payment processing unit to the bottom wall of the shell body.

When shell cap is in the closed position, the shell body and the shell cap come together to form a cavity configured to partially enclose the electronic device and a chamber adjacent the cavity, the chamber configured to enclose the removable temperature controlling insert. The shell cap includes a notch configured to receive the inner disc of the circular locking mechanism to lock the shell body and the shell cap together.

In various examples, the inner disc of the circular locking mechanism defines an irregular circular geometry having a varying radius relative to the rotational axis of the circular locking mechanism. The inner disc of the circular locking mechanism may define a varying thickness. The inner disc of the circular locking mechanism may define an irregular circular geometry having a varying radius relative to the rotational axis of the circular locking mechanism, and a varying thickness, wherein the thickness of the inner disc increases as the radius increases. The electronic device holder may include a camera passage including a first aperture formed in the dividing wall of the shell body, a second aperture formed in the bottom wall of the shell body, and a slanted sidewall connecting the first aperture and the second aperture. The electronic device holder may include a removable foam insert disposed in the chamber.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
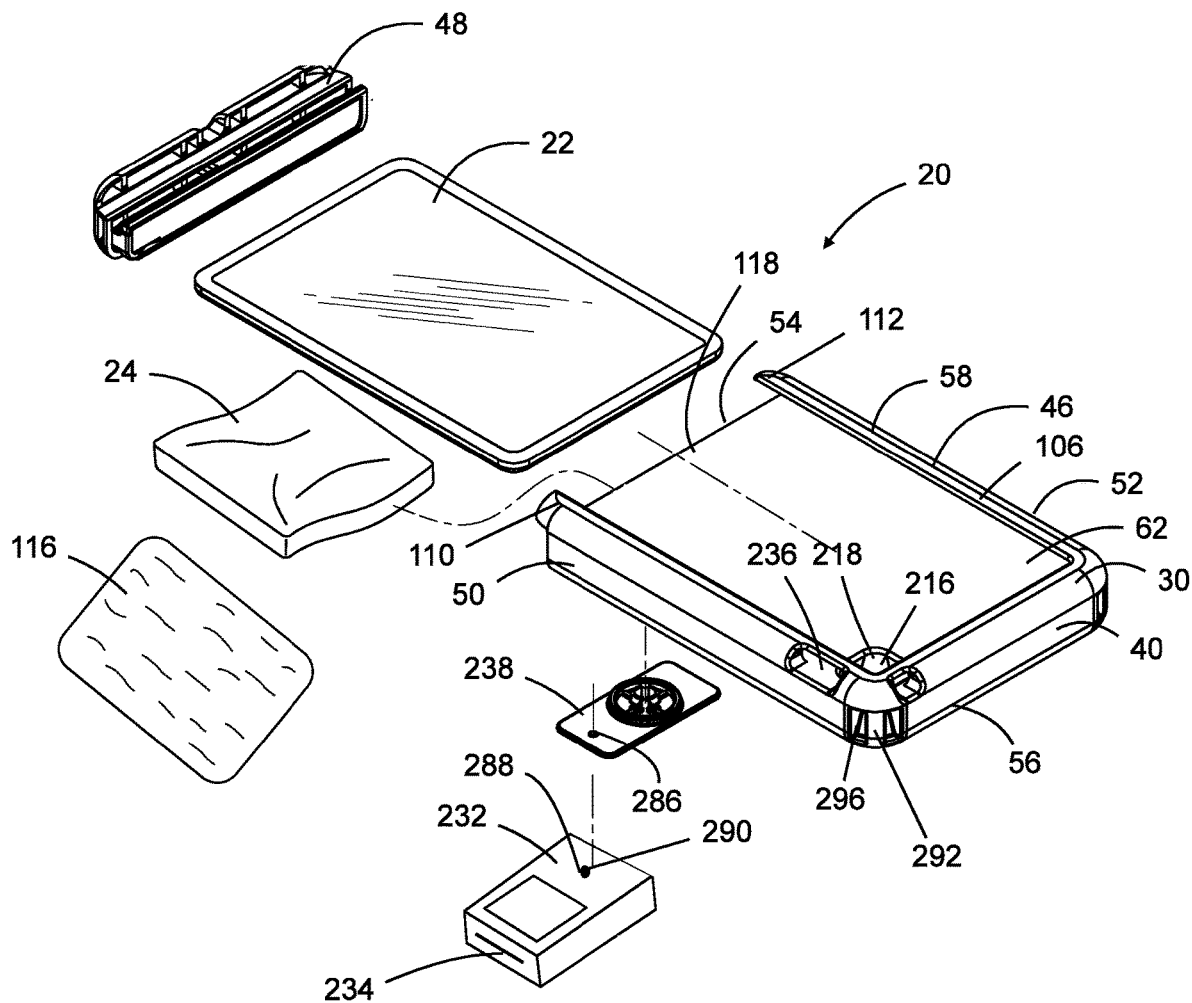
FIG. 1 is an exploded view illustrating the electronic device holder according to the present disclosure.
Figure 2:
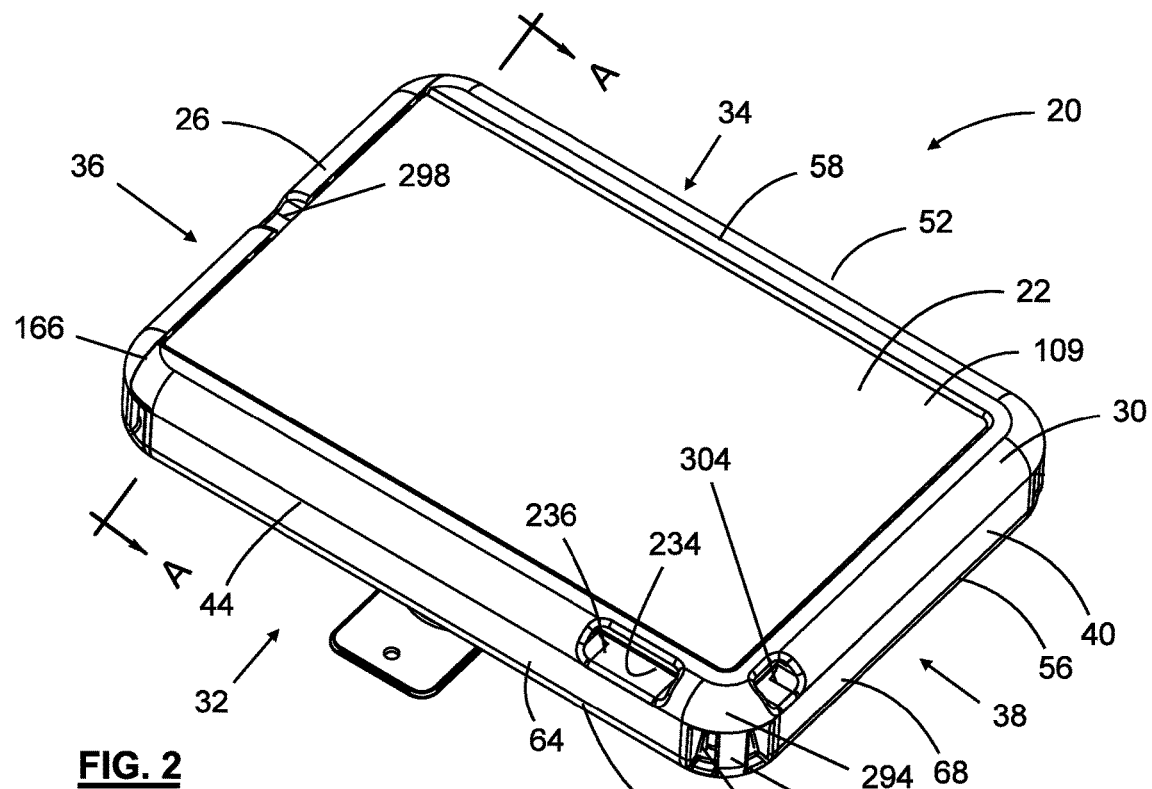
FIG. 2 is a top front perspective view of an electronic device holder, depicting the electronic device holder in a closed position with an electronic device installed according to one embodiment of the present disclosure.
Figure 3:
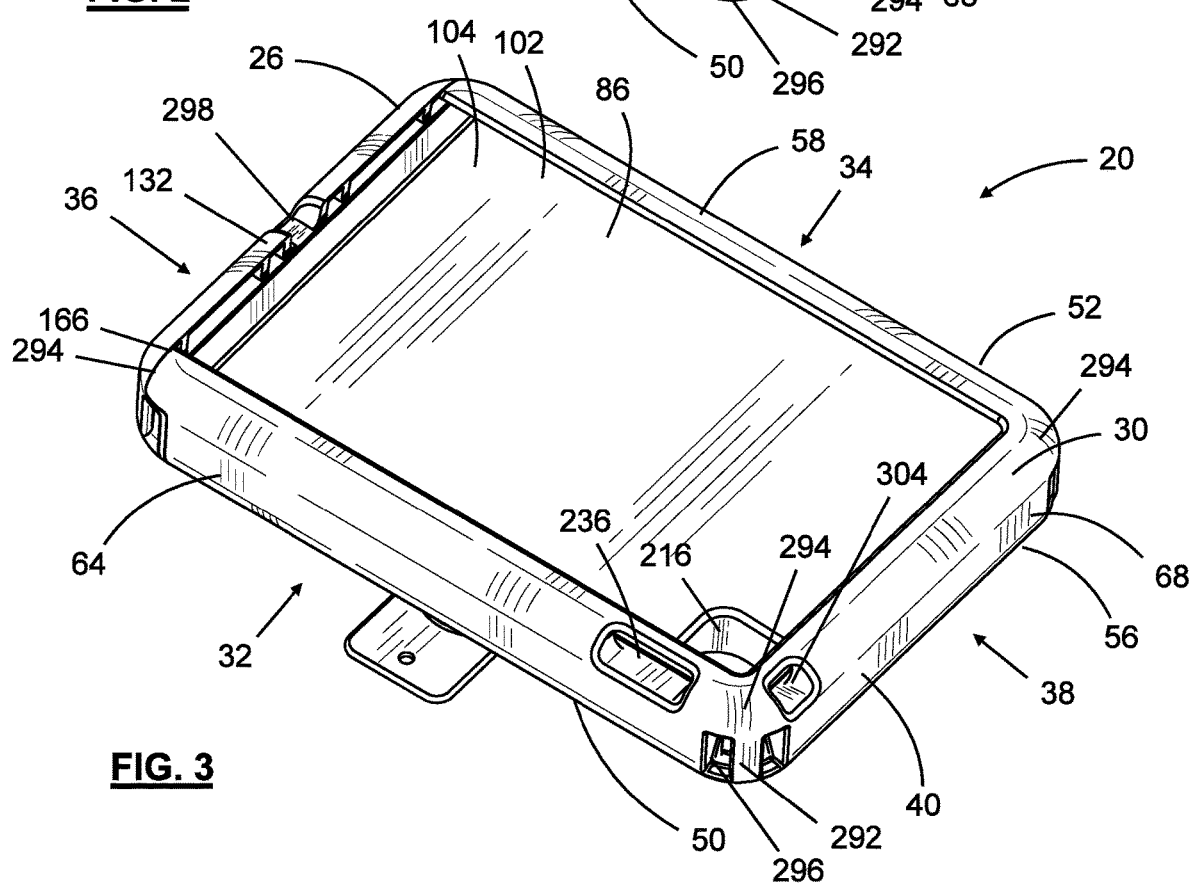
FIG. 3 is top front perspective view of the electronic device holder shown in FIG. 2, without the electronic device.
Figure 4:
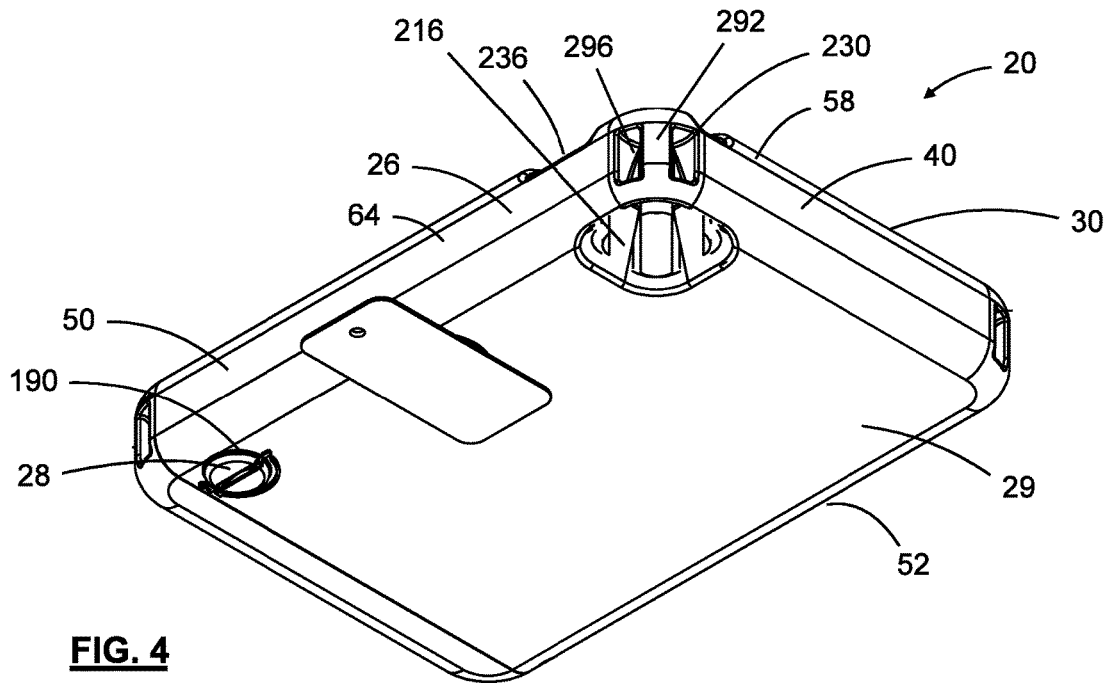
FIG. 4 is bottom front perspective view of the electronic device holder shown in FIG. 2, depicting the electronic device holder in the closed position.
Figure 5:
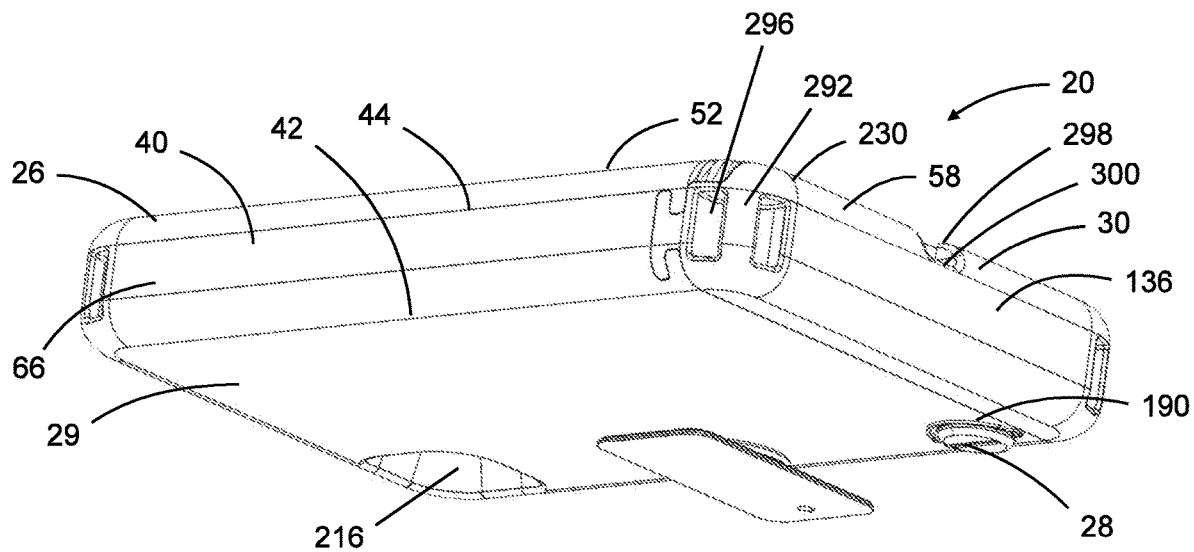
FIG. 5 is bottom back perspective view of the electronic device holder shown in FIG. 2, depicting the electronic device holder in the closed position.

The following description of technology is merely exemplary in nature of the subject matter, manufacture, and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed.

The terms "a" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. The term "about" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected, or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below," or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

All documents, including patents, patent applications, and scientific literature cited in this detailed description are incorporated herein by reference, unless otherwise expressly indicated. Where any conflict or ambiguity can exist between a document incorporated by reference and this detailed description, the present detailed description controls.

Referring to FIGS. 1-5, an electronic device holder 20 is shown for holding an electronic device 22, such as a portable tablet, and a removable temperature controlling insert 24 for cooling or heating the electronic device 22. It should be appreciated that the dimensions, shapes, and configurations of the electronic device holder 20 can be modified to conform to any type of portable electronic device and/or manufacturer, such as a payment processing unit, a cellular phone, portable computer, personal digital assistant, and the like, without departing from the scope of the present disclosure. The removable temperature controlling insert 24 may be further described as at least one of a cooling insert and a heating insert. The cooling insert may be a reusable ice pack, as a non-limiting example. Desirably, the ice pack can facilitate cold air to accumulate around the electronic device 22, thereby militating against the electronic device 22 from overheating. In certain examples, the ice pack can have low moisture packaging. Advantageously, the low moisture packaging can minimize the condensation to militate against water from coming into contact with the electronic device 22. The warming insert can include an air activated warmer. Desirably, the air activated warmer can militate against a battery of the electronic device 22 from freezing when the electronic device holder 20 is exposed to cold weather. It should be appreciated that one skilled in art can employ different types of cooling and warming technologies for the cooling insert and the warming insert, respectively.

The electronic device holder 20 includes a shell 26 and a lock assembly 28 attached to the shell 26. The shell 26 includes a bottom side 29 and a top frame 30 defining a thickness therebetween. The shell 26 further includes a front side 32, a back side 34, a left side 36, a right side 38, and a sidewall 40 extending between the bottom side 29 and top frame 30, wherein the sidewall 40 generally surrounds a perimeter 42 of the bottom side 29, extends toward the top frame 30 and generally surrounds a perimeter 44 of the top frame 30.

In one specific example, the shell 26 comprises a shell body 46 and a shell cap 48 configured to be coupled together to form the shell 26.

Referring to FIGS. 1, 6 and 9-10, the shell body 46 comprises a first end 50, a second end 52, a first side 54, a second side 56, a top portion 58, a bottom wall 60, and a dividing wall 62 positioned between the bottom wall 60 and top portion 58. A front sidewall 64, a back sidewall 66, and a right sidewall 68, are disposed at the first end 50, the second end 52, and the second side 56, respectively, of the shell body 46. The front sidewall 64, back sidewall 66, and right sidewall 68 extends from the bottom wall 60 to the top portion 58.

The bottom wall 60 includes an interior surface 70, an exterior surface 72, a right end 74, and a left end 76. A lower groove 78 and a lower protrusion 80 disposed between the lower groove 78 and the left end 76 may be formed on the interior surface 70 of the bottom wall 60. Each one of the lower groove 78 and the lower protrusion 80 extends along a length of the left end 76 of the bottom wall 60. The lower groove 78 and the lower protrusion 80 are configured for slidable engagement with an upper arm 82 and a lower slot 84 of the shell cap 48, respectively, which is described in greater detail below.

The dividing wall 62 includes a top surface 86, a bottom surface 88 opposite the top surface 86, a right end 90, and a left end 92. An upper groove 94 and an upper protrusion 96 disposed between the upper groove 94 and the left end 92 may be formed on the bottom surface 88 of the dividing wall 62. Each one of the upper groove 94 and the upper protrusion 96 extends along a length of the left end 92 of the dividing wall 62. The upper groove 94 and the upper protrusion 96 are configured for slidable engagement with a lower arm 98 and an upper slot 100 of the shell cap 48, respectively, which is described in greater detail below.

The top portion 58 of the shell body 46 includes a cavity 102 having a generally flat inner surface 104 formed by the top surface 86 of the dividing wall 62. The top portion 58 is configured to secure the electronic device 22 within the shell body 46. The top portion 58 generally extends along a perimeter of the first end 50, the second side 56, and the second end 52 of the shell body 46. A rim 106 may be integrally formed along an inner boundary 108 of the top portion 58 thereby creating a slight overhang to the cavity 102 to facilitate securing the electronic device 22 within the electronic device holder 20. The rim 106 partially frames an area where a display screen 109 of the electronic device 22 is located to permit the user to view the display screen 109. As best shown in FIG. 1, in a non-limiting example, the rim 106 is shown extending along the entire inner boundary 108 of the top portion 58 of the shell body 46, beginning proximate a front top-left corner 110 of the shell body 46 and ending proximate a back top-left corner 112. However, it should be appreciated that one skilled in the art may scale the location and dimensions of the rim 106, as desired.

Figure 6:
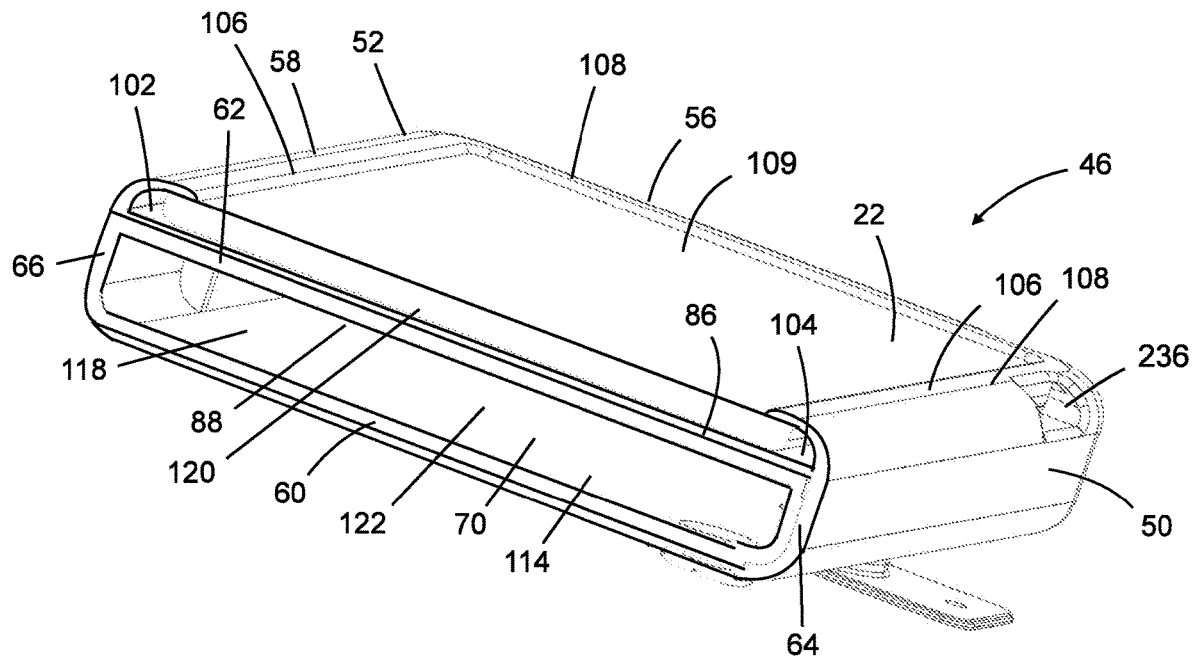
FIG. 6 is a cross-sectional left perspective view of the electronic device holder taken at section line A-A in FIG. 2.
Figure 9:
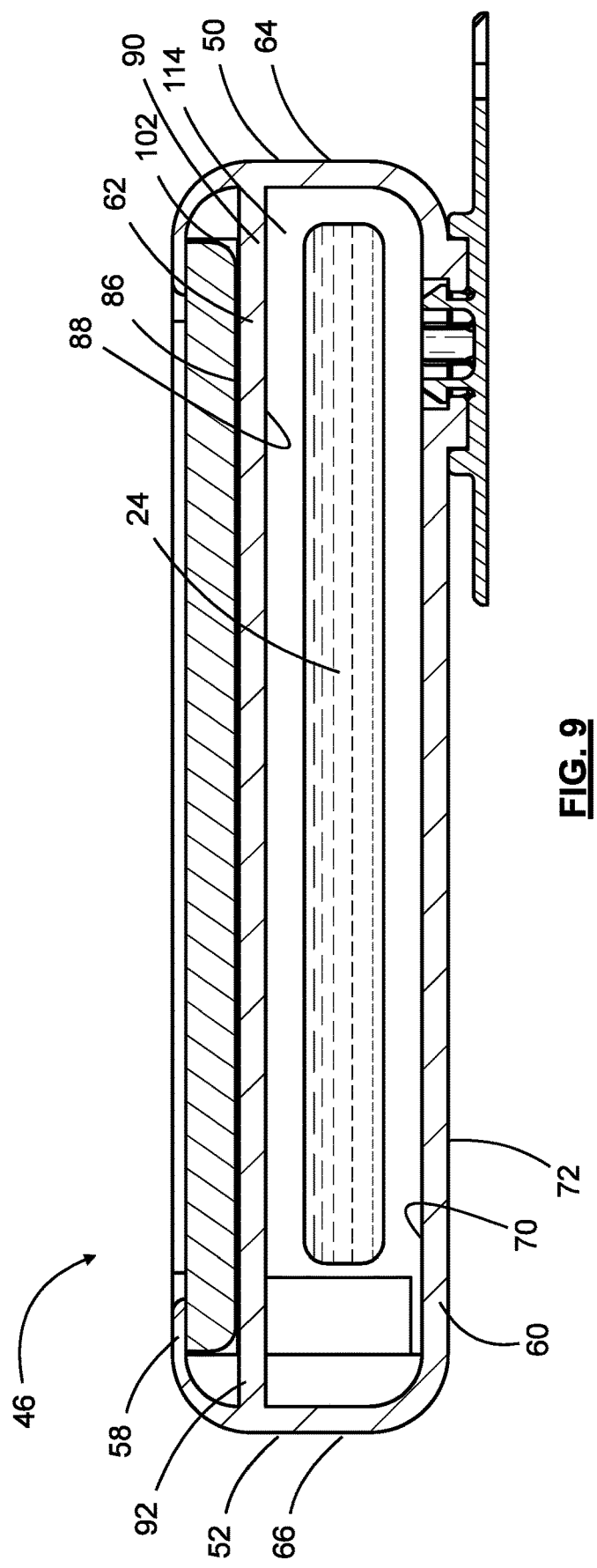
FIG. 9 is a cross-sectional left side elevational view of the electronic device holder taken at section line B-B in FIG. 7.
Figure 10:
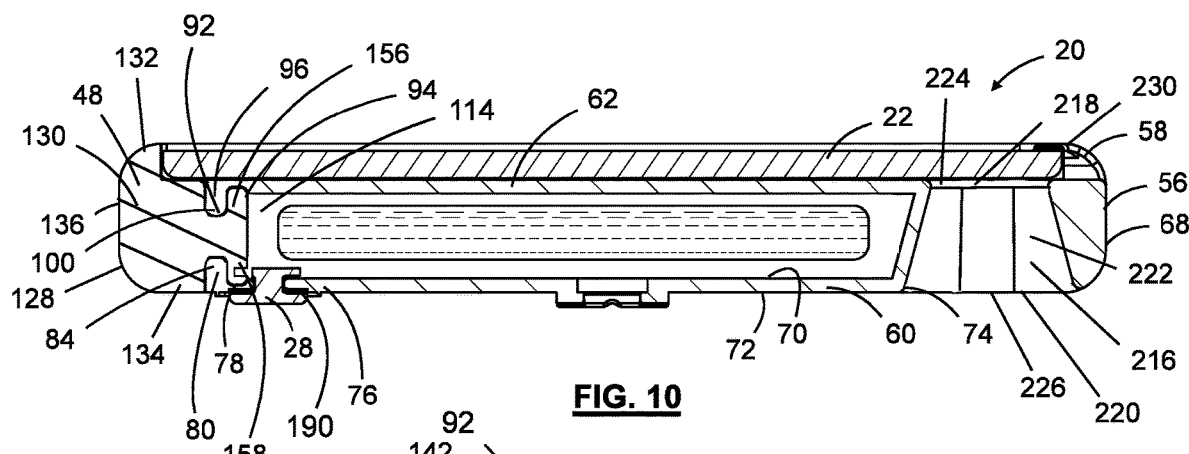
FIG. 10 is a cross-sectional front elevational view of the electronic device holder taken at section line C-C in FIG. 7.
Figure 11:
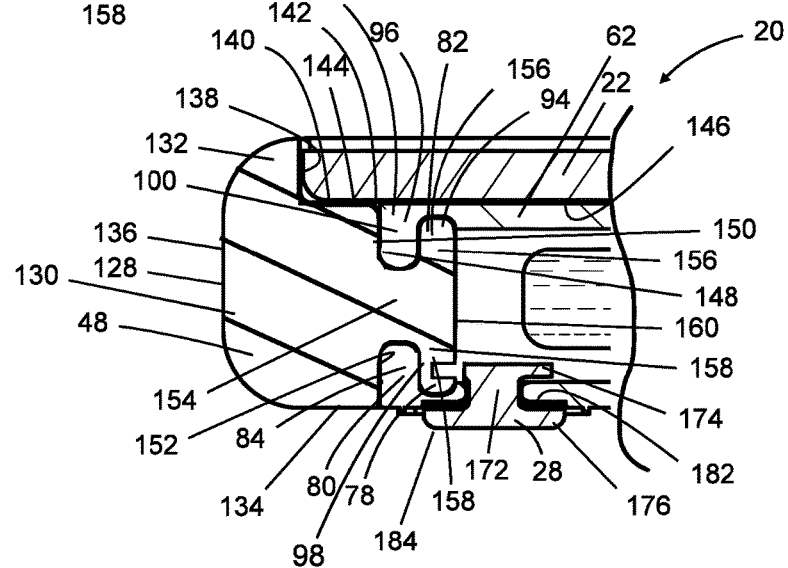
FIG. 11 is an enlarged cross-sectional view of a shell cap engaged with a shell body as shown in FIG. 10.

As shown in FIGS. 6 and 9-10, the shell body 46 further includes a chamber 114 formed between the cavity 102 and the bottom wall 60. The chamber 114 is configured to house the removable temperature controlling insert 24 for cooling or heating the electronic device 22. The chamber 114 may be adjacent the cavity 102. The chamber 114 may be orientated substantially parallel to the cavity 102. More specifically, the chamber 114 is formed as defined by the bottom surface 88 of the dividing wall 62, the interior surface 70 of the bottom wall 60, and the front sidewall 64, right sidewall 68, and back sidewall 66 of the shell body 46. The front sidewall 64, right sidewall 68, and back sidewall 66 may inhibit access to the chamber 114 from the first end 50, second side 56, and second end 52 of the shell body 46, respectively. The dividing wall 62 may separate the cavity 102 from the chamber 114.

Referring to FIG. 1, the electronic device holder 20 may have a removable foam insert 116 disposed in the chamber 114 adjacent to the removable temperature controlling insert 24. In one example, the removable foam insert 116 is disposed between the removable temperature controlling insert 24 and the dividing wall 62. The removable foam insert 116 may be formed to a predetermined volume designed to fill any open space between the removable temperature controlling insert 24 and the dividing wall 62. Advantageously, without being bound to any particular theory, by filling the open space between the removable temperature controlling insert 24 and the dividing wall 62 with the removable foam insert 116, condensation may be less likely to form and any condensation that does form may be absorbed by the removable foam insert 116. Desirably, by militating against the formation and retention of condensation, the electronic device 22 may be less likely to be damaged from water and the shell 26 may be easier to handle without a wet surface.

The removable foam insert 116 disposed between the removable temperature controlling insert 24 and the dividing wall 62 may militate against the removable temperature controlling insert 24 from moving within the chamber 114 of the shell body 46. Advantageously, by militating against the movement of the removable temperature controlling insert 24 within the chamber 114 of the shell body 46, the removable temperature controlling insert 24 may not slide within the chamber 114. Desirably, by militating against the movement of the removable temperature controlling insert 24 within the chamber 114 of the shell body 46, the temperature controlling electronic device holder 20 apparatus may provide a more structurally sound perception to a user.

With reference to FIGS. 1 and 6, the shell body 46 has at least one aperture 118 through the first side 54 of shell body 46 configured to allow the user to selectively insert the electronic device 22 into the cavity 102, the removable temperature controlling insert 24 into the chamber 114, and/or the removable foam insert 116 into the chamber 114. Desirably, this can allow the user to remove the electronic device 22 from the electronic device holder 20, when not in use. In addition, the at least one aperture 118 permits the user to insert the cooling insert or the warning insert depending on the weather.

In a non-limiting example, as shown in FIG. 6, the at least one aperture 118 includes a first aperture 120 and a second aperture 122 disposed on the first side 54 of the shell body 46. More specifically, the first aperture 120 is located at the top portion 58 and through the first side 54 of the shell body 46, the first aperture 120 being configured to allow for the electronic device 22 to be inserted into or removed from the cavity 102. The second aperture 122 is located through the first side 54 of the shell body 46 between the first aperture 120 and bottom wall 60, the second aperture 122 being configured to allow for the removable temperature controlling insert 24 and/or the removable foam insert 116 to be inserted into or removed from the chamber 114.

The bottom wall 60, the dividing wall 62, the top portion 58, and the front sidewall 64, right sidewall 68, and back sidewall 66 of the shell body 46 may be integrally formed.

As non-limiting examples, the shell body 46 may be formed from injection molding, compression molding, 3D printing, or other known methods in the art. However, it should be appreciated that some or all components of the shell body 46 (i.e., the bottom wall 60, dividing wall 62, top portion 58, front sidewall 64, right sidewall 68, and back sidewall 66) may be separate components joined together via any joining method known in the art, such as for example mechanical fastening, adhesives, integrated attachment features, etc., while still remaining within the scope of the present disclosure. The material used to form the shell body 46 may be plastic, nylon, or silicone, as non-limiting examples.

Referring to FIGS. 10-13, the shell cap 48 comprises a first end 124, a second end 126, a first side 128, a second side 130, a top portion 132, a bottom portion 134, and a left sidewall 136 disposed at the first side 128. The left sidewall 136 extends from the bottom portion 134 to the top portion 132. The top portion 132 includes a first interior surface 138 extending from the first end 124 to the second end 126 and a shelf 140 extending from the first interior surface 138 to an inner edge 142. The shelf 140 is configured to form part of a mating contact surface 144 that mates with a bottom surface 146 of the electronic device 22.

The shell cap 48 is detachably coupled to the shell body 46 and configured to move between an open position and a closed position. In the open position, the shell cap 48 is at least substantially or entirely detached from the shell body 46 leaving at least a substantial portion of the first side 54 of the shell body 46 exposed. When the shell cap 48 is in the open position, the electronic device 22, removable temperature controlling insert 24, and/or the removable foam insert 116 can be inserted or removed from the shell body 46 via the at least one aperture 118. In the closed position, the shell cap 48 is attached to the first side 54 of the shell body 46 such that the at least one aperture 118 is covered. When in the closed position, the shell cap 48 is configured to retain the electronic device 22, the removable temperature controlling insert 24, and/or the removable foam insert 116 within the shell body 46 while the electronic device holder 20 is in use.

In one example, the shell cap 48 is detachably coupled to the shell body 46 via sliding engagement. As such, the shell cap 48 further includes a second interior surface 148 having an upper portion 150 and a lower portion 152, and a projection 154 extending from the second interior surface 148, wherein the projection 154 separates the upper portion 150 and lower portion 152 of the second interior surface 148. The projection 154 includes an upper arm 156, a lower arm 158, and a third interior surface 160. An upper slot 100 is formed between the upper portion 150 of the second interior surface 148 and the upper arm 156 of the projection 154. A lower slot 84 is formed between the lower portion 152 of the second interior surface and 148 the lower arm 156 of the projection 154.

The upper slot 100 and the lower slot 84 of the shell cap 48 are configured to receive the upper protrusion 96 of the dividing wall 62 and the lower protrusion 80 of the bottom wall 60, respectively. Each one of the upper slot 100 and the lower slot 84 completely captures the upper protrusion 96 of the dividing wall 62 and the lower protrusion 80 of the bottom wall 60, respectively, to facilitate bidirectional slidable movement. In other words, when the shell cap 48 engages with the shell body 46 (i.e., in the closed position), the upper protrusion 96 disposed in the upper slot 100 is captured on each side thereof, and the lower protrusion 80 disposed in the lower slot 84 is captured on each side thereof, thus restricting movement of the upper and lower protrusions 96, 80 except for forward and rearward sliding motion through the upper and lower slots 100, 84. The upper groove 94 of the dividing wall 62 and the lower groove 78 of the bottom wall 60 are configured to receive and partially capture the upper arm 82 and the lower arm 98 of the shell cap 48, respectively, to help facilitate bidirectional slidable movement. Partially capture meaning only an end portion 162, 164 of the upper and lower arms 82, 98, respectively, are captured.

In operation, the user places the first end 124 of the shell cap 48 near the second end 52 of the shell body 46 and then aligns (i) the upper slot 100 of the shell cap 48 with the upper protrusion 96 of the dividing wall 62, (ii) the lower slot 84 of the shell cap 48 with the lower protrusion 80 of the bottom wall 60, (iii) the upper groove 94 of the dividing wall 62 with the upper arm 156 of the shell cap 48, and (iv) the lower groove 78 of the bottom wall 60 with the lower arm 158 of the shell cap 48. Next, the user simultaneously slides the upper and lower protrusions 96, 80 into the upper and lower slots 100, 84 and the upper and lower arms 156, 158 into the upper groove 94 and lower groove 78 in a forward direction until the first end 124 of the shell cap 48 is aligned with and flush with the first end 50 of the shell body 46, therefore, moving the shell cap 48 from the open position to the closed position. As such, the shell cap 48 and shell body 46 come together around a perimeter of the electronic device 22 to partially enclose the electronic device 22 and fully enclose the removable temperature controlling insert 24.

Once in the closed position, i.e., the shell cap 48 and shell body 46 engaged, (i) the bottom wall 60 of the shell body 46 and the bottom portion 134 of the shell cap 48 forms the bottom side 29 of the shell 26, (ii) the top portion 58 of the shell body 46 and the top portion 132 of the shell cap 48 forms the top frame 30 of the shell 26, and (iii) the front sidewall 64, back sidewall 66, and right sidewall 68 of the shell body 46 combined with the left sidewall 136 of the shell cap 48 forms the sidewall 40 of the shell 26. A seam 166 is formed at a boundary 168 where the shell body 46 and shell cap 48 come together. Furthermore, the top surface 86 of the dividing wall 62 and the shelf 140 of the shell cap 48 forms the mating contact surface 144 configured to be in contact with a bottom surface 146 of the electronic device 22.

Although the shell cap 48 is illustrated as forming the left side 36 of the electronic device holder 20, it should be appreciated that a skilled artisan may employ the shell cap 48 as forming, for example, the right side 38, front side 32, or back side 34 of the electronic device holder 20, as desired.

Referring to FIGS. 10-11 and 13-15, the lock assembly 28 is configured to be engaged or disengaged. While in engaged, the lock assembly 28 can militate against the shell cap 48 from being moved from the closed position to the open position. When disengaged, the lock assembly 28 can permit the shell cap 48 to be moved from the closed position to the open position. The lock assembly 28 is disposed on the shell body 46 near the boundary 168 where the shell body 46 and shell cap 48 come together.

Figure 7:
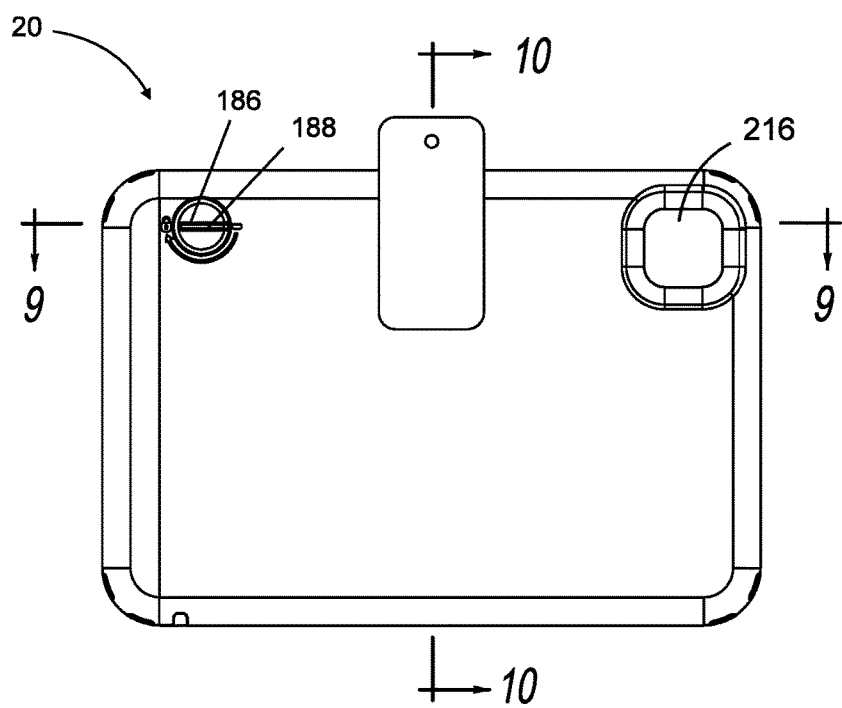
FIG. 7 is a bottom plan view of the electronic device holder shown in FIG. 2.

In one example, the lock assembly 28 is a turning lock assembly having a circular locking mechanism 170. The circular locking mechanism 170 comprises a cylindrical body 172, an inner disc 174, and an outer disc 176, wherein the inner disc 174 and outer disc 176 are disposed at opposing ends of the cylindrical body 172. The inner disc 174 includes a bottom side 178 and a top side 180. The outer disc 176 includes an inner annular surface 182 and a top side 184 having an engagement feature 186 (FIG. 7) configured to allow the user to turn the circular locking mechanism 170.

Figure 13:
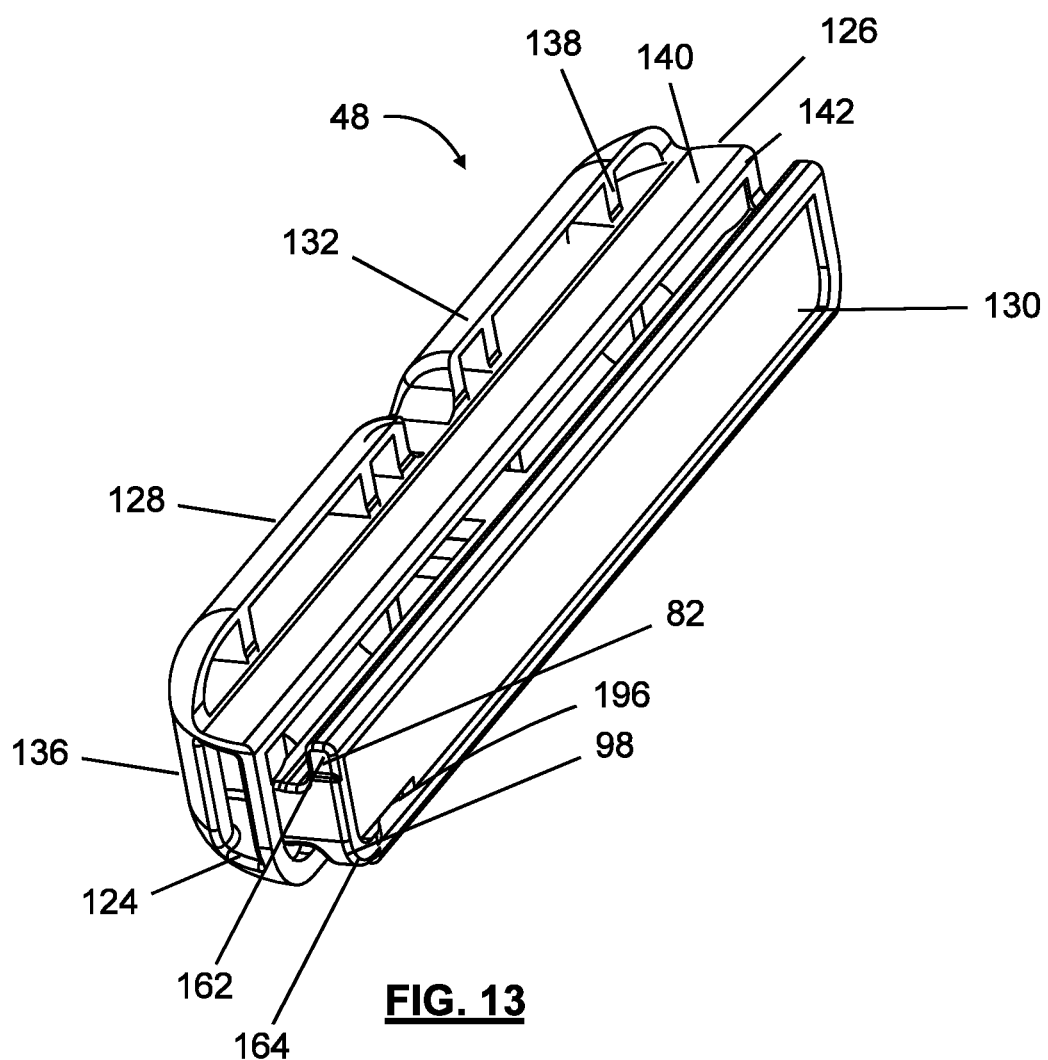
FIG. 13 is a top perspective view of a shell cap according to the present disclosure.

In a non-limiting example, as shown in FIG. 13, the engagement feature 186 is a groove 188 for receiving a tool, such as a flat-head screwdriver to facilitate turning of the circular locking mechanism 170. It should be appreciated that the engagement feature 186 is not limited to this specific configuration and one skilled in the art can employ other configurations, as desired.

The shell body 46 includes an annular depression 190 on the exterior surface 72 of the bottom wall 60. A hole 192 is disposed at a center 194 of the annular depression 190 through which the cylindrical body 172 of the circular locking mechanism 170 extends. The hole 192 has a circular geometry configured to permit the circular locking mechanism 170 to rotate about the hole 192. When the cylindrical body 172 is installed in the hole 192, the outer disc 176 rests in the annular depression 190, and the inner disc 174 is positioned on the interior surface 70 of the bottom wall 60 such that the bottom side 178 of the inner disc 174 is in contact with the interior surface 70 of the bottom wall 60.

Figure 15:
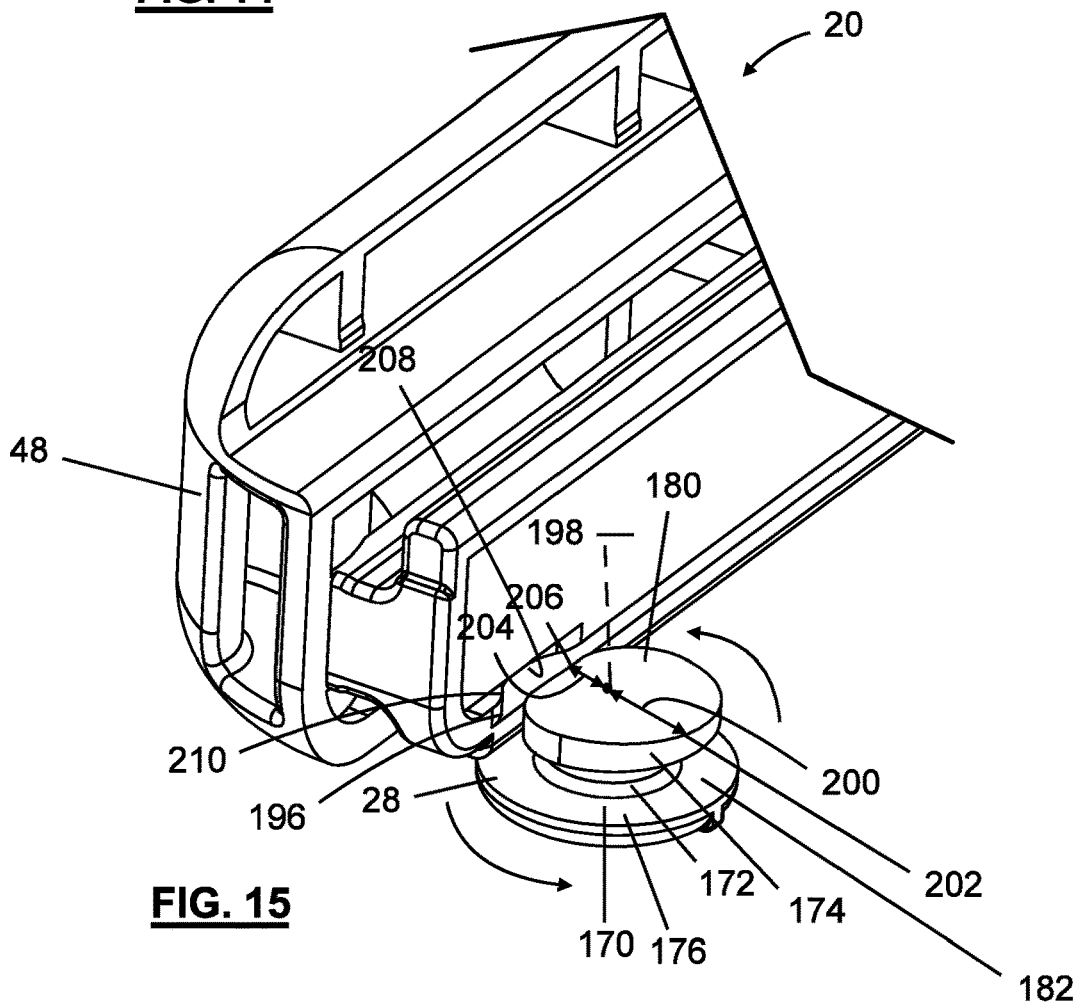
FIG. 15 is an enlarged view of the lock assembly of FIG. 14.

The inner disc 174 is configured to engage with a notch 196 located on the shell cap 48, and more specifically, the notch 196 is located on the third interior surface 160 of the projection 154. The inner disc 174 has an irregular circular geometry with a varying radius relative to the rotational axis 198 of the circular locking mechanism 170. As illustrated in FIG. 15, the inner disc 174 may have a first radius 200 from the rotational axis 198 to a first location 202 that is greater than a second radius 204 from the rotational axis 198 to an opposing second location 206. When the lock assembly 28 is disengaged, the second location 206 of the inner disc 174 is closer in proximity to the notch 196 than the first location 202, however, no portion of the inner disc 174 is disposed within the notch 196 thereby permitting the shell cap 48 to be moved from the closed position to the open position.

In operation, the user rotates the outer disc 176 clockwise via the engagement feature 186 causing the inner disc 174 to rotate and begin engagement with the notch 196. As the inner disc 174 rotates, the increasing radius allows the inner disc 174 to enter the notch 196 until the first location 202 is engaged with the notch 196. Specifically, a portion of the top side 180 and bottom side 178 of the inner disc 174 near the first location 202 is engaged with an upper face 208 and a lower face 210 of the notch 196, respectively, thereby inhibiting the shell cap 48 from being moved.

The notch 196 and inner disc 174 may be sized to generate friction between the upper face 208 and lower face 210 of the notch 196 and the top side 180 and bottom side 178 of the inner disc 174.

Figure 14:
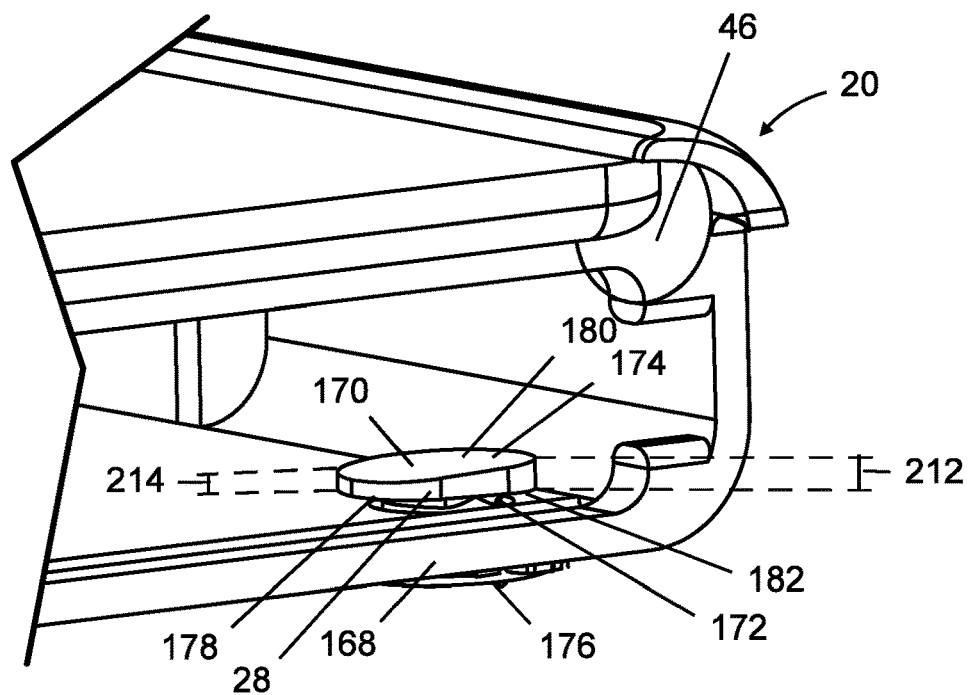
FIG. 14 is a partial cross-sectional perspective view taken through a left side front corner of the electronic device holder showing the lock assembly according to the present disclosure.

In on example, the inner disc 174 may define a varying thickness for additional friction between the notch 196 and inner disc 174 to provide for a stronger locking engagement. With reference to FIG. 14, a thickness 212 of the inner disc 174 at the first location is greater than a thickness 214 at the second location 206. In operation, as the user rotates the circular locking mechanism 170 and as the inner disc 174 is rotating into the notch 196, the thickness of the inner disc 174 increases as the radius increases causing greater friction between the upper face 208 and lower face 210 of the notch 196 and top side 180 and bottom side 178 of the inner disc 174.

Referring to FIGS. 3-5 and 10, the electronic device holder 20 may include a camera passage 216 adapted to align with and correspond with a camera (not shown) of the electronic device 22. Advantageously, the camera passage 216 allows the user to still use the camera of the electronic device 22, even when being held by the electronic device holder 20. The camera passage 216 includes a first aperture 218 formed in the dividing wall 62 of the shell body 46, a second aperture 220 formed in the bottom wall 60 of the shell body 46, and a slanted sidewall 222 connecting the first aperture 218 and the second aperture 220. The first aperture 218 defines a perimeter 224 and the second aperture 220 defines a perimeter 226. In one example, the perimeter 226 of the second aperture 220 is greater than the perimeter 224 of the first aperture 218 to permit more light to enter the camera passage 216 for better quality photos and/or videos.

The camera passage 216 is configured to be positioned and shaped to permit stable coupling of a camera interface 228 (FIG. 12) e.g., an interface having only a camera lens, an interface having a camera lens and a flash, etc., of the camera to the electronic device holder 20, and thus providing stable alignment of the camera interface 228 and camera passage 216. With reference to FIG. 10, in one specific example, the camera passage 216 is positioned near a front right corner 230 of the electronic device holder 20 in order to align with the camera interface 228 of the electronic device 22. The camera passage 216 defines a truncated pyramid shape with rounded edges. Accordingly, the first aperture 218 defines a square shape (FIG. 12) with rounded corners that align with and correspond with a camera interface 228 that is square with rounded corners. The perimeter 226 of the second aperture 220 is greater than the perimeter 224 of the first aperture 218 (FIG. 10), which not only provides more light for high quality photos and videos, but also inhibits the camera from being obstructed by the electronic device holder 20.

It should be appreciated that one skilled in art may scale the location and dimensions of the camera passage 216, as desired. For example, it should be understood that the camera passage 216 is not limited to a truncated pyramid shape and that one skilled in the art may employ any shape for the first aperture 218 and second aperture 220 of the camera passage 216, such as a circle, rectangle, stadium, square, and so forth, as desired, to correspond with the shape of the camera interface 228 of the camera.

The electronic device holder 20 may include a payment processing unit 232. Non-limiting examples of the payment processing unit 232 can include a standalone card reader and a portable tablet or mobile phone with an attached card reader.

In one embodiment, the payment processing unit 232 having a card reader 234 may be disposed within the cavity 102 of the shell 26. The shell 26 may include a card aperture 236 disposed on the top frame 30 in a location corresponding to a location of the card reader 234. In a specific example shown in FIGS. 1-3, the card aperture 236 is disposed on the top portion 58 of the first end 50 of the shell body 46. The card aperture 236 is configured to permit at least one of a credit card and a debit card through the card aperture 236 to be read and processed by the card reader 234.

Figure 16:
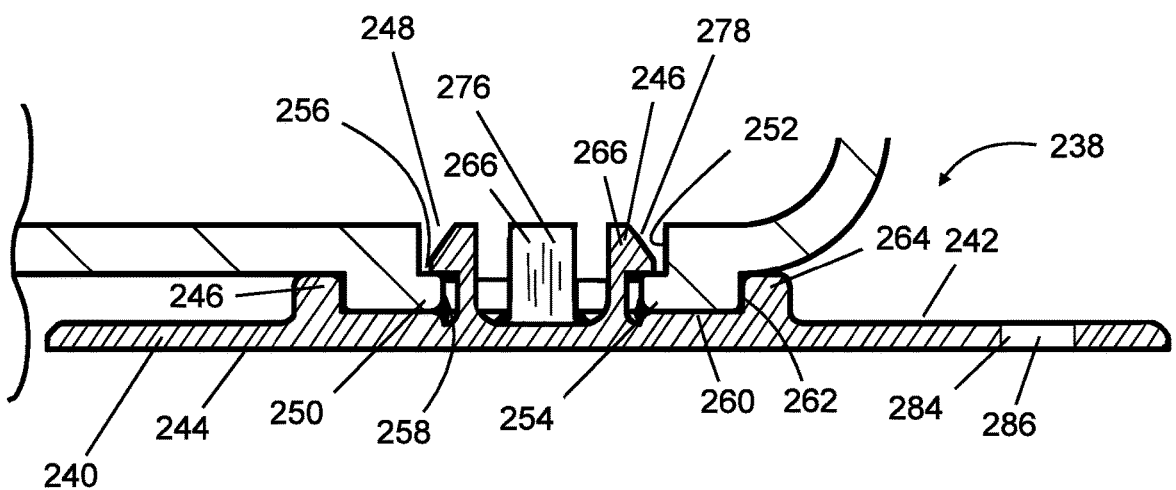
FIG. 16 is an enlarged view of a coupling mechanism coupled to the electronic device holder as shown in FIG. 9.
Figure 17:
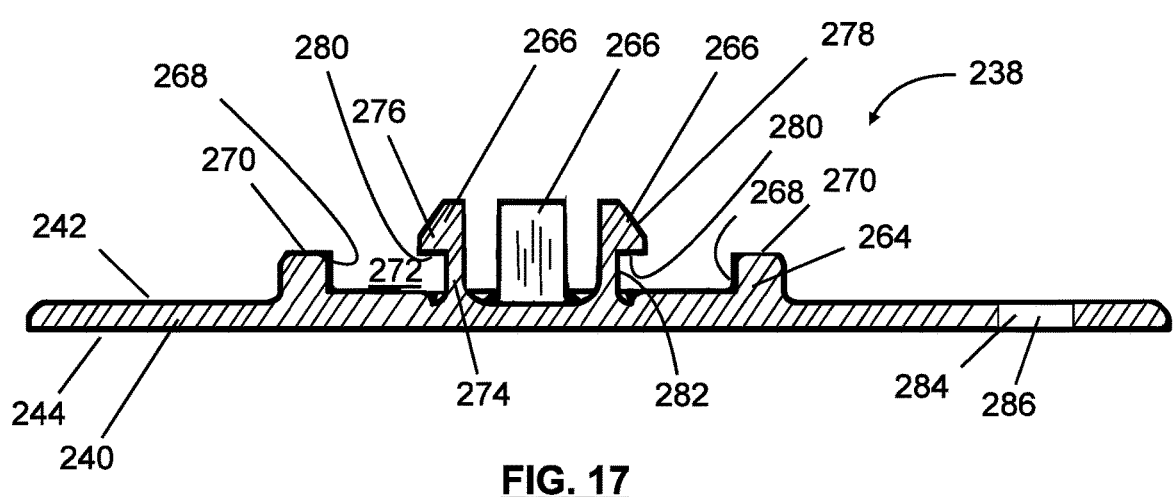
FIG. 17 is a cross-sectional view of the coupling mechanism according to the present disclosure.

Referring to FIGS. 16-17, in another embodiment, the electronic device holder 20 may include a coupling mechanism 238 for mounting a payment processing unit 232 to the electronic device holder 20. The coupling mechanism 238 includes a mounting plate 240 having an inner surface 242, an outer surface 244, and mating features 246 disposed on the inner surface 242. The shell 26 defines an attachment aperture 248 configured to receive the mating features 246 of the coupling mechanism 238. In one specific example, the attachment aperture 248 is disposed on the bottom wall 60 proximate the first end 50 of the shell body 46 and a radial projection 250 extends from the exterior surface 72 of the bottom wall 60 proximate the attachment aperture 248. The attachment aperture 248 defines a circular shape and includes a first internal face 252, and a portion 254 of the radial projection 250 extends radially inward from the first internal face 252 such that a ledge 256 is formed. The radial projection 250 includes a second internal face 258, an exterior face 260, and an outer face 262.

It should be appreciated that the mounting plate 240 may be configured to be removably coupled to the electronic device holder 20 or permanently coupled to the electronic device holder 20.

In one example, the mating features 246 are in the form of a circumferential rib 264 and a plurality of snap hooks 266. The circumferential rib 264 extends axially from the inner surface 242 of the mounting plate 240, the circumferential rib 264 defining an internal interface 268 and a top interface 270. The plurality of snap hooks 266 are disposed concentrically interiorly of the circumferential rib 264 forming a circumferential channel 272 between the circumferential rib 264 and plurality of snap hooks 266. Each snap hook among the plurality of snap hooks 266 include a body 274 axially protruding from the inner surface 242 of the mounting plate 240, and a hook head 276 having an angled face 278 and ledge interface 280. The ledge interface 280 is configured to engage with the ledge 256 of the attachment aperture 248. More specifically, the plurality of snap hooks 266 are resilient such that when the plurality of snap hooks 266 are inserted into the attachment aperture 248, the force applied causes the radial projection 250 to make contact with and apply pressure to the angled face 278 of each hook head 276 such that each snap hooks 266 flexes or bends inward toward the center of the attachment aperture 248 thereby moving each snap hooks 266 from a resting position to a retracted position while being inserted, and once inserted, each snap hooks 266 snaps back to the resting position. Thus, during installation, the ledge interface 280 of each hook head 276 couples to the ledge 256 of the radial projection 250, thereby inhibiting the plurality of snap hooks 266 from being detached from the electronic device holder 20 while each hook head 276 is engaged with the ledge 256.

Furthermore, once the plurality of snap hooks 266 are installed and in the resting position, the second internal face 258, the exterior face 260, and the outer face 262 of the radial projection 250 are in mating contact with the external surface 282 of each of the plurality of snap hooks 266, the inner surface 242 of the mounting plate 240, and the internal interface 268 of the circumferential rib 264, respectively, thereby securing the radial projection 250 in the circumferential channel 272 formed between the circumferential rib 264 and plurality of snap hooks 266 such that the mounting plate 240 is coupled to the electronic device holder 20.

The plurality of snap hooks 266 and the circumferential rib 264 may be capable of moving circumferentially about the attachment aperture 248 and radial projection 250, respectively, to change orientation of the mounting plate 240. Desirably, this can allow the payment processing unit 232 to be rotated toward a consumer to allow the consumer to access the payment processing unit 232. Non-limiting examples of the payment processing unit 232 can include a standalone credit card reader and a mobile phone with an attached credit card reader.

The mounting plate 240 further includes attachment features 284 configured to attach the payment processing unit 232 to the mounting plate 240, and thus the electronic device holder 20. In a non-limiting example, the attachment feature 284 is an orifice 286 configured to receive a bolt (not shown) having external threads. In this example, the payment processing unit 232 includes an insert having internal threads on a mating surface 290 (FIG. 1). The mating surface 290 is in mating contact with the outer surface 244 of the mounting plate 240 such that the insert is aligned with the orifice 286. Once the insert 288 and orifice 286 are aligned, the bolt is inserted through the orifice 286 and into the insert. The internal threads of the insert engages with the external threads of the bolt thereby securing the payment processing unit 232 to the mounting plate 240. It should be appreciated that one skilled artisan may employ any fastening method known in the art, as desired.

With reference to FIGS. 1-5 and 12, in another embodiment, the electronic device holder 20 may have a way to attach at least one of a strap, a handle, a clip, and a loop. The shell 26 may include at least one pillar 292 disposed at a corner 294 of the electronic device holder 20. The at least one pillar 292 extends from the bottom side 29 to the top frame 30 of the shell 26. The at least one pillar 292 may be formed by a curved hollow 296 at a corner 294 of the electronic device holder 20. A curved hollow 296 is disposed between the at least one pillar 292 and the electronic device 22 and extends from the bottom side 29 to the top frame 30 of the shell 26. The at least one pillar 292 is configured to be an attachment point to permit the attachment of at least one of a strap, a handle, a clip, and a loop. In one example, the electronic device holder 20 includes four pillars 292 disposed at corresponding corners 294 permitting the user to selectively choose the corner 294 and number pillars 292 used to conform to the use of the electronic device holder 20.

Figure 8:
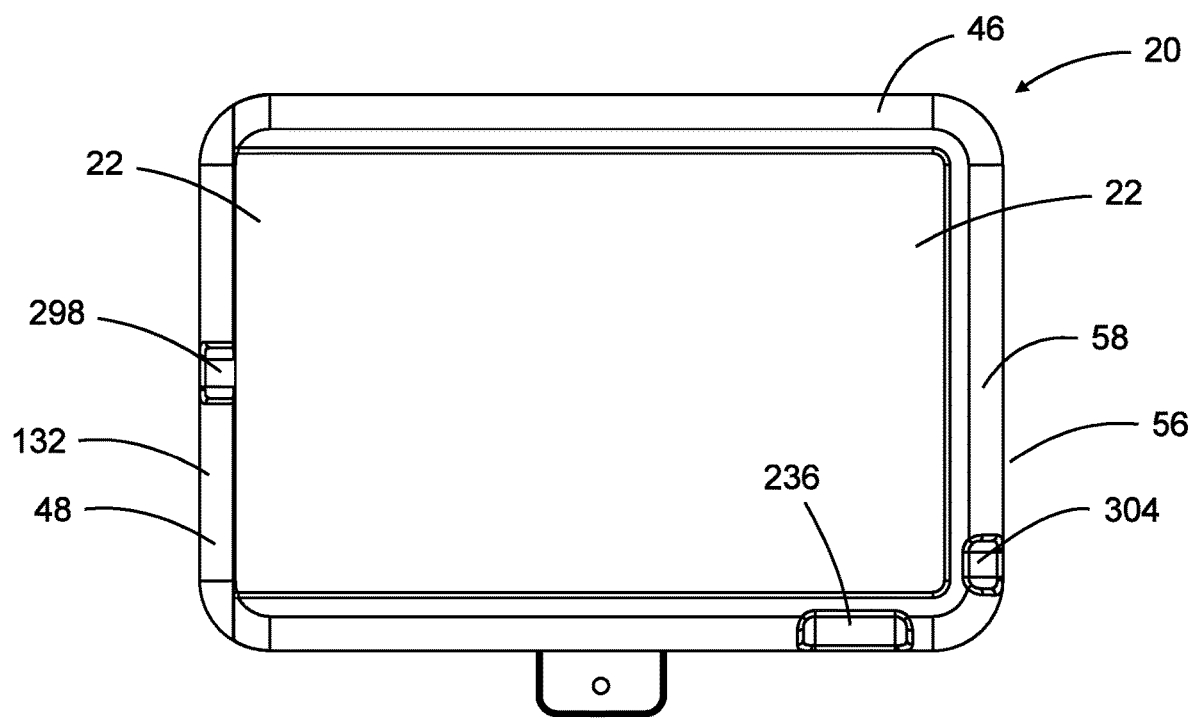
FIG. 8 is a top plan view of the electronic device holder shown in FIG. 2.

Referring to FIG. 8, in another embodiment, the electronic device holder 20 may have an access port 298 to provide access to the electronic device 22. The access port 298 may be configured to allow a user to access the functional features on the electronic device 22, such as the volume buttons, cameras, charging ports, speakers, and microphone ports, as non-limiting examples. Advantageously, the access port 298 may allow a user to utilize these functional features on the electronic device 22 while the electronic device holder 20 is still in use.

In a specific example, the electronic device holder 20 includes an access port 298 disposed at a center of the top portion 132 of the shell cap 48 and extends to an edge 300 of the left sidewall 136 of the shell cap 48 for connecting the electronic device 22 to a power cord to charge or to other electronic devices. The access port 298 is configured to be aligned with the charging port of the electronic device 22 to permit the user access to the charging port thereby allowing the electronic device 22 to be charged while in use. The electronic device holder 20 may further include a second access port 304 disposed on the top portion 58 of the second side 56 of the shell body 46 for connecting the electronic device 22 to a headphone jack and/or access to a microphone. The second access port 304 is configured to be aligned with the headphone jack and microphone of the electronic device 22 to permit the user to connect headphones into the headphone jack and access to the microphone while the electronic device holder 20 is in use.

It should be appreciated that one skilled in the art may scale the quantity, location, type, dimensions, shapes, and configurations of the access ports 298 to conform to any type of portable electronic device and/or manufacturer, as desired.

Figure 12:
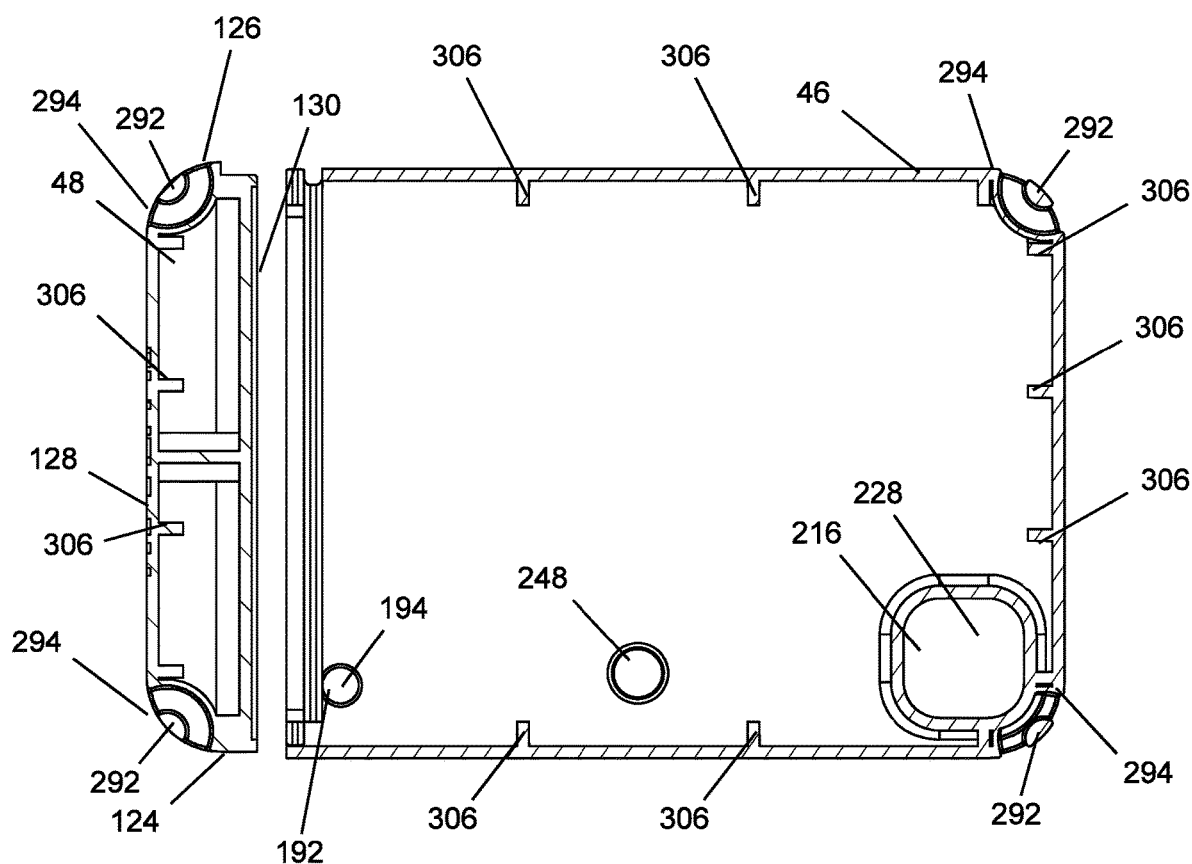
FIG. 12 is a cross-sectional top view of the electronic device holder, depicting the device in an open position according to the present disclosure.

With reference to FIG. 12, in another embodiment of the present disclosure, the electronic device holder 20 includes a plurality of support ribs 306 configured to provide additional stability to the electronic device holder 20 thereby protecting the electronic device 22 from damage. The plurality of support ribs 306 are disposed along the sidewall 40 of the shell 26 at a predetermined distance between each support rib 306. Each one of the plurality of support ribs 306 disposed along the front sidewall 64, the back sidewall 66, and the right sidewall 68 of the shell body 46 may extend from the interior surface 70 of the bottom wall 60 to the bottom surface 88 of the dividing wall 62. Each one of the plurality of support ribs 306 disposed along the left sidewall 136 of the shell cap 48 may extend from the bottom portion 134 to the top portion 132 of the shell cap 48. The plurality of support ribs 306 provides greater strength and durability to the electronic device holder 20. Furthermore, the plurality of support ribs 306 may act as a shock absorbing system configured to protect the electronic device 22 against abrupt impact or shock.

Advantageously, the electronic device holder 20 has the capability to safely and adequately control the temperature of components of the electronic device 22 where an external environment has harsh temperatures and conditions while also protecting the electronic device 22 from damage.

While certain representative embodiments and details have been shown for purposes of illustrating the invention, it will be apparent to those skilled in the art that various changes may be made without departing from the scope of the disclosure, which is further described in the following appended claims.

What is claimed is:

1. An electronic device holder for controlling a temperature of an electronic device, comprising:
    a shell body including a bottom wall, a top portion, and a dividing wall between the bottom wall and top portion;
    a shell cap detachably coupled to the shell body, the shell cap configured to move between an open position and a closed position;
    a removable temperature controlling insert disposed in the shell body; and
    a card aperture disposed on the top portion of the shell body, the card aperture configured to receive a card to be processed by a card reader,
    wherein when the shell cap is in the closed position, the shell cap is coupled to the shell body and forms a cavity at the top portion of the shell body and a chamber adjacent the cavity, the chamber configured to enclose the removable temperature controlling insert.

2. The electronic device holder of claim 1 further comprising a lock assembly disposed on the shell body, the lock assembly configure to lock the shell cap in place when the shell cap is in the closed position.

3. The electronic device holder of claim 1 further comprising an access port.

4. The electronic device holder of claim 1 further comprising a pillar formed by a curved hollow located at a corner of the electronic device holder.

5. The electronic device holder of claim 1, wherein:
    the shell body includes an upper protrusion extending from the dividing wall and a lower protrusion extending from the bottom wall, and
    the shell cap includes an upper slot configured to receive the upper protrusion for sliding engagement and a lower slot configured to receive the lower protrusion for sliding engagement.

6. The electronic device holder of claim 5, wherein the upper protrusion and lower protrusion are configured to slide within the upper slot and lower slot in a forward direction and rearward direction to move the shell cap between the open position and closed position.

7. The electronic device holder of claim 1 further comprising a camera passage including a first aperture formed in the dividing wall of the shell body, a second aperture formed in the bottom wall of the shell body, and a slanted sidewall connecting the first aperture and the second aperture.

8. The electronic device holder of claim 7, wherein a perimeter of the second aperture is greater than a perimeter of the first aperture.

9. An electronic device holder for controlling a temperature of an electronic device, comprising:
    a shell body including a bottom wall, a top portion, and a dividing wall between the bottom wall and top portion;
    a shell cap detachably coupled to the shell body, the shell cap configured to move between an open position and a closed position;
    a removable temperature controlling insert disposed in the shell body; and
    a coupling mechanism configured to removably couple a payment processing unit to the bottom wall of the shell body,
    wherein when the shell cap is in the closed position, the shell body and the shell cap come together to form a cavity configured to partially enclose the electronic device and a chamber adjacent the cavity, the chamber configured to enclose the removable temperature controlling insert.

10. The electronic device holder of claim 9 further comprising an attachment aperture disposed on the bottom wall of the shell body, wherein the coupling mechanism includes a mounting plate having mating features, and the attachment aperture is configured to receive the mating features.

11. The electronic device holder of claim 9 further comprising a camera passage including a first aperture formed in the dividing wall of the shell body, a second aperture formed in the bottom wall of the shell body, and a slanted sidewall connecting the first aperture and the second aperture.

12. The electronic device holder of claim 9 further comprising a plurality of support ribs disposed along a sidewall of the shell body and a sidewall of the shell cap, wherein the plurality of support ribs are disposed at a predetermined distance between each support rib.

13. The electronic device holder of claim 9 further comprising an attachment aperture disposed on the bottom wall of the shell body, wherein the coupling mechanism includes a mounting plate having a circumferential rib and a plurality of snap hooks disposed concentrically interiorly of the circumferential rib, the plurality of snap hooks configured to mate with the attachment aperture.

14. The electronic device holder of claim 13, wherein a circumferential channel is formed between the circumferential rib and the plurality of snap hooks, the circumferential channel configured to receive a radial projection extending from the attachment aperture.

15. An electronic device holder for controlling a temperature of an electronic device, comprising:
    a shell body including a bottom wall and a top portion;
    a shell cap detachably coupled to the shell body, the shell cap configured to move between an open position and a closed position;
    a circular locking mechanism disposed at the bottom wall of the shell body, the circular locking mechanism including a cylindrical body, an inner disc, and an outer disc, the inner disc and the outer disc are disposed at opposing ends of the cylindrical body;
    a removable temperature controlling insert disposed in the shell body; and
    a payment processing unit to the bottom wall of the shell body,
    wherein when the shell cap is in the closed position, the shell body and the shell cap come together to form a cavity configured to partially enclose the electronic device and a chamber adjacent the cavity, the chamber configured to enclose the removable temperature controlling insert, and wherein the shell cap includes a notch configured to receive the inner disc of the circular locking mechanism to lock the shell body and the shell cap together.

16. The electronic device holder of claim 15, wherein the inner disc of the circular locking mechanism defines an irregular circular geometry having a varying radius relative to a rotational axis of the circular locking mechanism.

17. The electronic device holder of claim 15, wherein the inner disc of the circular locking mechanism defines a varying thickness.

18. The electronic device holder of claim 15, wherein the inner disc of the circular locking mechanism defines an irregular circular geometry having a varying radius relative to a rotational axis of the circular locking mechanism, and a varying thickness, wherein the thickness of the inner disc increases as the radius increases.

19. The electronic device holder of claim 15 further comprising a camera passage including a first aperture formed in a dividing wall of the shell body, a second aperture formed in the bottom wall of the shell body, and a slanted sidewall connecting the first aperture and the second aperture.

20. The electronic device holder of claim 15 further comprising a removable foam insert disposed in the chamber.

* * * * *